United States Patent
Choi

(10) Patent No.: US 6,198,237 B1
(45) Date of Patent: Mar. 6, 2001

(54) APPARATUS USING DOUBLE FOCUSING TYPE FLY-BACK TRANSFORMER

(75) Inventor: Sung Yoon Choi, Suwon (KR)

(73) Assignee: Samsung Electro-Mechanics Co., Ltd., Kyungki-Do (KR)

(*) Notice: Subject to any disclaimer, the term of this patent is extended or adjusted under 35 U.S.C. 154(b) by 0 days.

(21) Appl. No.: 09/134,611

(22) Filed: Aug. 14, 1998

(30) Foreign Application Priority Data

Aug. 20, 1997 (KR) .................................................. 97-22565
Jun. 5, 1998 (KR) .................................................... 98-9612

(51) Int. Cl.[7] ....................................................... H01J 29/70
(52) U.S. Cl. ........................... 315/411; 336/145; 327/538
(58) Field of Search ............................. 315/411; 336/145; 327/538

(56) References Cited

U.S. PATENT DOCUMENTS

| | | | |
|---|---|---|---|
| 5,475,358 | * 12/1995 | Kotani et al. | 338/70 |
| 5,627,437 | * 5/1997 | Kim | 315/399 |
| 5,731,959 | 3/1998 | Jeong . | |
| 6,005,435 | * 12/1999 | Saida et al. | 327/538 |

FOREIGN PATENT DOCUMENTS

08055746 * 2/1996 (JP) ...................... H01F/38/42
08255724 * 10/1996 (JP) ...................... H01F/38/42

* cited by examiner

Primary Examiner—Seungsook Ham
Assistant Examiner—Shun Lee
(74) Attorney, Agent, or Firm—Renner, Otto, Boisselle & Sklar LLP

(57) ABSTRACT

An apparatus using a double focusing type fly-back transformer is disclosed. A top bleeder type is adopted in drawing the focus voltage of the fly-back transformer instead of the conventional neutral point type, and the double patterns of the focus resistors are separated from each other instead of the conventional common connections to the ground on the substrate FUB of the focus unit part. Further, one or more of the separately installed focus resistor patterns is used as a feedback line together with the bleeder resistor, thereby drastically reducing the size of the bleeder resistor. The anode voltage output terminal is connected to the initial voltage setting part 12 and the high voltage stabilizing circuit part 11, so that one or more of the patterned resistors of the focus unit part together with the bleeder resistor BR2 can share in serving as feedback lines. That is, first the high voltage which is supplied from the anode voltage output terminal HV to the anode terminal is divided by the bleeder resistor BR2, the first variable resistor VR21, the resistor R21 and the third variable resistor VR23. Thus the voltage dividing task is shared by other elements, and therefore, the size of the substrate of the bleeder resistor BR2 can be reduced, with the result that the manufacturing cost of the fly-back transformer is reduced.

6 Claims, 6 Drawing Sheets

APPARATUS USING DOUBLE FOCUSING TYPE FLY-BACK TRANSFORMER

BACKGROUND OF THE INVENTION

1. Field of the Invention

The present invention relates to an apparatus using a double focusing type fly-back transformer. Particularly, the present invention relates to an apparatus using a double focusing type fly-back transformer, in which a top bleeder type is adopted in drawing the focus voltage of the fly-back transformer instead of the conventional neutral point type, the double patterns of the focus resistors are separated from each other instead of the conventional common connections to the ground on the substrate FUB of a focus unit part, and one or more of the separately installed focus resistor patterns is used as a feedback line together with the bleeder resistor, thereby drastically reducing the size of the substrate of the bleeder resistor.

2. Description of the Prior Art

FIG. 1 is a perspective view showing the external shape of the general double focusing type fly-back transformer. Referring to FIG. 1, the double focusing type fly-back transformer is generally used in televisions and computer monitors to supply an anode voltage, a double focus voltage and a screen voltage. In the double focusing type fly-back transformer 10 of FIG. 1, reference code VOLH indicates an adjusting volume for a horizontal focus voltage, VOLV indicates an adjusting volume for a vertical focus voltage, and VOLG indicates an adjusting volume for a screen voltage. Further, reference code CA0 indicates a cable for supplying an anode voltage to an anode of the monitor, and CA1, CA2 and CA3 indicates cables for supplying a horizontal focus voltage, vertical focus voltage and a screen voltage to respective grids of an electron gun. Reference code CAP indicates an anode cap.

FIG. 2 is a circuit diagram showing the circuital constitution of the apparatus using the conventional double focusing type fly-back transformer. Referring FIG. 2, in the conventional double focusing type fly-back transformer 10, a horizontal outputting part 5 includes a transistor Q1, a damper diode DD and a tuning capacitor CT. The horizontal outputting part 5 operates in accordance with horizontal synchronizing signals to generate pulses in a primary winding L1 of the fly-back transformer. The pulse type ac voltages of the primary winding L1 are stepped up, rectified and flattened by secondary windings L11, rectifying diodes D11–D16 and a high voltage capacitor C11. The fly-back transformer which operates in this manner supplies an anode voltage, and supplies a double focus voltage and a screen voltage through the focus unit part.

The double focusing type fly-back transformer 10 includes: a primary winding L1 with its one end connected to an output terminal of a horizontal outputting part 5, and with its another end connected to a power source B+, for obtaining collector pulses through LC-resonances of the horizontal outputting part 5; secondary windings L11–L16 for stepping up the pulse type ac voltages in accordance with the winding ratios of them to the primary winding L1; rectifying diodes D11–D16 for rectifying the ac voltages of the secondary windings; a high voltage capacitor C11 for flattening the rectified dc voltage; a bleeder resistor BR1 for sensing the CPT (color picture tube) discharge and the high voltage fluctuations at a set-off status; and a focus unit part for supplying two focus voltages (double focus voltage) and a screen voltage by utilizing a neutral point (upon D12) of the secondary windings L11–L16. Further, an iron core FC is disposed between the primary winding L1 and the secondary windings L11–L16.

The focus unit part is used on a large monitor of over 17 inches. This part is a double focus unit for supplying a horizontal focus voltage and a vertical focus voltage, and includes: serially connected fixed and first variable resistors R11 and VR11 for outputting the horizontal focus voltages to a horizontal focus voltage output terminal FH; serially connected fixed and second variable resistors R12 and VR12 for outputting the vertical focus voltages to a vertical focus voltage output terminal FV; and a third variable resistor VR13 connected between the connection point of the resistors R11 and R12 and a grounded first connection pint #11, for outputting the screen voltage to a screen voltage output terminal G2.

Meanwhile, the fly-back transformer 10 further includes: a coupling capacitor CP for outputting parabolic pulses $300V_{p-p}$ (supplied from the set through a second connection pin #12) onto the vertical focus voltage (about 4.5 KV–8.5 KV), the vertical voltage being outputted through the vertical focus voltage output terminal FV; and a bypass capacitor CB for bypassing to the ground the ac noise components such as the parabolic pulses contained in the horizontal focus voltage outputted through the horizontal focus voltage output terminal FH.

Further, in order to feed back the voltage to be compensated to the power source B+ in accordance with the high voltage fluctuations after detecting the high voltage fluctuations in the output of the fly-back transformer, the set side includes: a capacitor C13 connected between the ground and a high voltage capacitor C11 through a fourth connection pin #14; a capacitor C12 connected between a capacitor C11 and a bleeder resistor BR1 through a third connection pin #13; an initial voltage setting part 12 for voltage-dividing the anode voltage (a high voltage) through the bleeder resistor BR1 and its internal resistors; and a high voltage stabilizing circuit part 11 for compensating the power source B+ by feeding back the voltage of the initial voltage setting part 12.

FIG. 3 illustrates the printed patterns formed on the substrate FUB of the focus unit part of the double focusing type fly-back transformer of FIG. 2. Referring FIG. 3, the conventional substrate FUB of the focus unit part is a ceramic board, and a resistor PF is formed on the ceramic board. Here, reference codes PCA1–PCA3 indicate connection points for cables CA1–CA3. Reference codes PVOLH, PVOLV and PVOLG indicate volume connection points for adjusting volumes VOLH, VOLV and VOLG. Reference codes PCP and PCB indicate capacitor connection points for the coupling capacitor CP and the bypass capacitor CB. Reference code PD12 indicates a diode connection point to be connected to the diode D12, and P11 indicates a connection point for a first connection pin.

FIG. 4 illustrates the contour of the bleeder resistor BR1 of FIG. 2. Referring to FIG. 4, the conventional bleeder resistor BR1 has dimensions of about 15 mm×50 mm, and is formed by forming a printed pattern BRP1 upon a ceramic substrate BRB1. Reference code L13 indicates a lead line to be connected to a third connection pin #13, and LPH indicates a lead line to be connected to a connection point PH of an anode voltage output line. The fly-back transformer contains the bleeder resistor BR1 and the high voltage capacitor C11 with the same sizes. The fly-back transformer further includes the FUB and a bypass capacitor CB and a coupling capacitor CP connected to the FUB.

The conventional double focusing fly-back transformer constituted as above will now be described as to its operations.

First, referring to FIG. 2, the horizontal outputting part 5 which includes the horizontal output transistor Q1, the damper diode DD and the tuning capacitor CT operates within a range of 15–100 KHz in accordance with the horizontal synchronizing signals. The primary winding L1 which is connected between the output terminal of the horizontal outputting part 5 generates pulse type ac voltages. These ac voltage of the primary winding L1 are stepped up by the secondary windings L11–L16, and then, the ac voltages are rectified into a dc voltage. Then this dc voltage is flattened by the high voltage capacitor C11, and thus, a dc voltage of about 26 KV is outputted through an anode voltage output terminal HV to an anode terminal of a monitor or other picture receiving tubes.

Meanwhile, the level of the voltage which is supplied from the neutral point (upon D12) of the secondary windings L11–L16 is decided by the winding ratio of the secondary windings to the primary winding. This voltage (about 10 KV) is divided by the parallelly connected first and second variable resistors VR11 and VR12 and the serially connected third variable resistor VR13. A horizontal focus voltage which has been adjusted to a rated voltage of about 4.5–8.5 KV by the first variable resistor VR11 is outputted through the horizontal focus voltage output terminal FH. Further, a vertical focus voltage which has been adjusted to a rated voltage of about 4.5–8.5 KV by the second variable resistor VR12 is outputted through the vertical focus voltage output terminal FV. Further, a screen voltage which has been adjusted to a rated voltage of about 0.2–1.2 KV by the third variable resistor VR13 is outputted through the screen voltage output terminal G2.

In order to compensate the fluctuation amount of the high voltage supplied from the fly-back transformer, the set includes an initial voltage setting part 12 and a high voltage stabilizing circuit part 11. In the initial voltage setting part 12, the high voltage of about 26 KV is divided by the bleeder resistor BR1 of 600 MΩ and by the resistors (having a resistance range of 100–250 KΩ) of the initial voltage setting part 12. Therefore, the high voltage of 26 KV is divided mostly by the bleeder resistor BR1 (600 MΩ), while only 5 v is divided by the initial voltage setting part 12. Here, if the high voltage fluctuates to above 26 KV, then the initial voltage setting part 12 detects more than 5 v, while if the high voltage fluctuates to below 26 KV, then the initial voltage setting part outputs less than 5 V.

The high voltage stabilizing circuit part 11 compares the detected voltage of the initial voltage setting part 12 with an internal reference voltage (5 V) so as to detect the fluctuations of the high voltage. If the detected voltage is higher than the reference voltage, then a control is carried out such that the power source B+ should be reduced. On the other hand, if the detected voltage is lower than the reference voltage, then a control is carried out such that the power source B+ should be increased. For this purpose, that is, in order to compensate the fluctuations, a compensation voltage is fed back to the power source B+ of the primary winding L1.

In this conventional double focusing type fly-back transformer, the feedback detection voltage is detected from the dc high voltage, and based on the detected voltage, the compensation voltage is decided to supply it to the set. For this purpose, a separate feedback line including a bleeder resistor is required, while in the set, the initial voltage setting part and the high voltage stabilizing circuit part (or IC) are required to feed back the compensation voltage to the power source B+ based on the detected voltage.

However, the bleeder resistor which constituted the feedback line of the double focusing type fly-back transformer is formed by printing a printed pattern BRP1 upon on a ceramic substrate BRB1 as shown in FIG. 4. The bleeder resistor has to have a large resistance value to withstand against a voltage breakdown, and therefore, the length of the printed pattern is extended, while it cannot be printed densely. The substrate BRB1 on which the bleeder resistor of the conventional fly-back transformer is formed becomes very long, and therefore, it occupies a large area within the transformer. As a result, the bulk of the transformer is increased, and therefore, the manufacturing cost is increased, as well as making it impossible to realize a miniaturization. Thus the increase in the product price becomes problematic.

SUMMARY OF THE INVENTION

The present invention is intended to overcome the above described disadvantages of the conventional technique.

Therefore it is an object of the present invention to provide an apparatus using a double focusing type fly-back transformer in which the size of the substrate of the bleeder resistor is drastically decreased.

It is another object of the present invention to provide an apparatus using a double focusing type fly-back transformer in which a top bleeder type is adopted in drawing the focus voltage of the fly-back transformer instead of the conventional neutral point type.

It is still another object of the present invention to provide an apparatus using a double focusing type fly-back transformer in which the double patterns of the focus resistors are separated from each other instead of the conventional common connections to the ground on the substrate FUB of the focus unit part, and one or more of the separately installed focus resistor patterns is used as a feedback line together with the bleeder resistor, so that the bleeder resistor can divide the output voltage of the anode voltage output terminal, and that the focus resistor patterns can perform the voltage dividing function of the bleeder resistor, thereby drastically reducing the size of the bleeder resistor.

In achieving the above objects, the apparatus using a double focusing type fly-back transformer to supply a horizontal focus voltage, a vertical focus voltage and a screen voltage to CRT of TV sets, monitors or the like according to the present invention includes: a horizontal outputting part for supplying horizontal synchronizing signals of video signals in a form of pulses to a primary winding; a plurality of secondary windings for carrying out a voltage step-up in accordance with winding ratios of them to the primary winding; rectifying diodes for rectifying the stepped-up output ac voltages of the secondary windings; a high voltage capacitor for flattening the output voltages of the secondary windings; an anode output terminal for supplying the rectified and flattened output voltages to a CRT; a compensating circuit means for sensing dc high voltage fluctuations of the anode output terminal to compensate error values; a bleeder resistor consisting of a printed pattern formed on a substrate, with its one end connected to the anode voltage output terminal; and a focus unit part formed by being printed on the substrate, and connected between another end of the bleeder resistor and the compensating circuit means, whereby the dc high voltage of the anode output terminal is divided by the bleeder resistor and the focus unit part to reduce the required resistance value and the bleeder resistance value so as to make it possible to reduce the size of the printed substrate of the bleeder resistor.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

Figure 5:
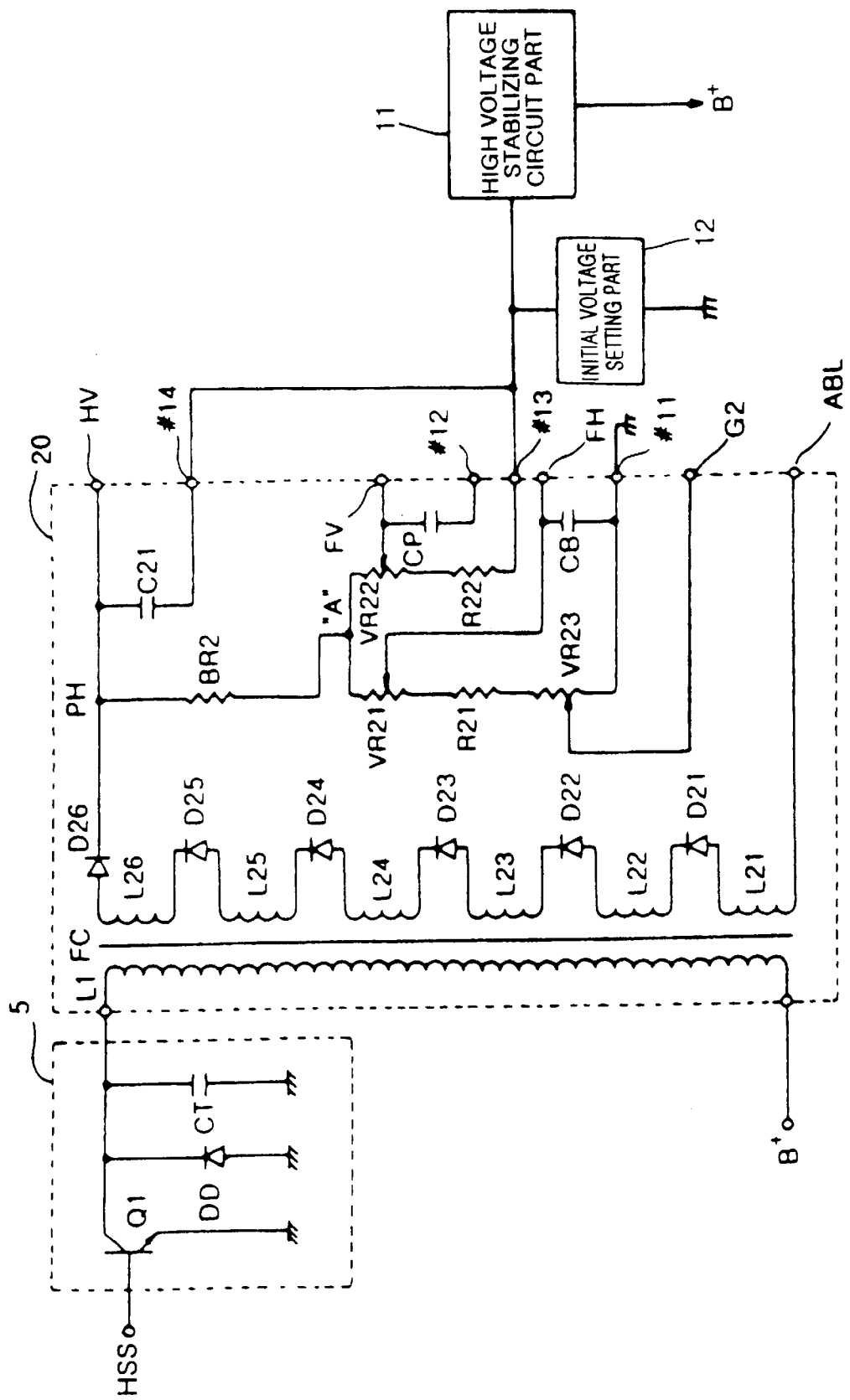
FIG. 5 is a circuit diagram showing the circuital constitution of the apparatus using a double focusing type fly-back transformer according to the present invention.

FIG. 5 is a circuit diagram showing the circuital constitution of the apparatus using a double focusing type fly-back transformer according to the present invention. Referring to FIG. 5, the apparatus using a double focusing type fly-back transformer includes a horizontal outputting part 5, a fly-back transformer 20 and a compensating circuit means.

The horizontal outputting part 5 includes a horizontal output transistor Q1, a damper diode DD and a tuning capacitor CT. The horizontal outputting part 5 operates in accordance with horizontal synchronizing signals HSS of incoming video signals to supply pulse type ac voltages to a primary winding L1 of the fly-back transformer 20.

One end of the primary winding L1 of the fly-back transformer 20 is connected to an output terminal of a horizontal outputting part 5, and another end of the primary winding L1 is connected to a power source B+.

Further, the double focusing type fly-back transformer 20 according to the present invention includes: a primary winding L1 for obtaining collector pulses through LC resonances of the horizontal outputting part 5; a plurality of secondary windings L21–L26 for carrying out a voltage step-up in accordance with winding ratios of them to the primary winding L1; rectifying diodes D21–D26 for rectifying ac voltages of the secondary windings L21–L26; a high voltage capacitor C21 for flattening the dc voltage to output it to an anode voltage output terminal HV; a substrate FUB of the focus unit part having printed patterns of resistors for supplying a horizontal focus voltage, a vertical focus voltage and a screen voltage through horizontal and vertical focus voltage output terminals FH and FV and a screen voltage output terminal G2; a feedback line for connecting an anode voltage output terminal HV to an initial voltage setting part 12 and a high voltage stabilizing circuit part 11 so as to compensate fluctuations of a dc voltage; a bleeder resistor BR2 consisting of a printed pattern, with its one end connected to the dc anode voltage output terminal HV; a first variable resistor VR21 provided in the form of a printed pattern on the substrate FUB of the focus unit part, and connected between another end (point A) of the bleeder resistor BR2 and a first connection pin #11, the first connection pin #11 being connected to a ground; and a second variable resistor VR22 provided in the form of a printed pattern on the substrate FUB of the focus unit part, and connected between a third connection pin #13 and a connection point (point A) (between the bleeder resistor BR2 and the first variable resistor VR21).

The compensating circuit part for compensating the error values detects the dc high voltage fluctuations, and includes: an initial voltage setting part and a high voltage stabilizing part.

The focus unit part includes: a first variable resistor VR21 for furnishing horizontal focus voltages; a second variable resistor VR22 for furnishing vertical focus voltages; and a third variable resistor VR23 for furnishing screen voltages.

Further, a feedback line of the double focusing type fly-back transformer is connected between an anode voltage output terminal and an initial voltage setting part of the set side to detect the compensation voltage so as to stabilize the high voltage. This feedback line can be constituted by serially connecting a bleeder resistor BR2 and a second variable resistor VR22 between the anode voltage output terminal HV and the third connection pin #13 connected to the high voltage stabilizing circuit part 11. Or it can be constituted by serially connecting the bleeder resistor BR2 and a first variable resistor VR21 between the anode voltage output terminal HV and the third connection pin #13 connected to the high voltage stabilizing circuit part 11.

Further, the double focusing type fly-back transformer includes: a horizontal focus voltage output terminal FH connected to the first variable resistor VR21; a bypass capacitor CB connected between the horizontal focus voltage output terminal FH and a first connection pin #11 connected to the ground of the set, for bypassing ac noises such as parabolic pulses to the ground; a vertical focus voltage output terminal FV connected to the second variable resistor VR22; and a coupling capacitor CP connected between the vertical focus voltage output terminal FV and a second connection pin #12, for receiving the parabolic pulses from the set. The vertical focus voltage output terminal FV is connected to the first variable resistor VR21, while the horizontal focus voltage output terminal FH is connected to the second variable resistor VR22.

The double focusing type fly-back transformer further includes: a third variable resistor VR23 which is serially connected between another end of the first variable resistor VR21 and the first connection pin #11, and which is also connected to the screen voltage output terminal G2, for providing a screen voltage. The third variable resistor VR23 can be formed by serially connecting it between another end of the first variable resistor VR21 and the first connection pin #11, and by also connecting it to the screen voltage output terminal G2, for providing a screen voltage.

According to the above described constitutions, one or more variable resistors are serially connected between another end of the bleeder resistor BR2 and the compensating circuit means and within the focus unit part.

Meanwhile, the connection pins #11, #12, #13 and #14 are for being connected to the set. That is, reference code #11 indicates the connection pin connected to the ground, and #12 indicates the connection pin connected to a terminal for receiving parabolic pulses from the set. Reference codes #13 and #14 indicate connection pins for being connected to the high voltage stabilizing circuit part 11 and the initial voltage setting part 12. Code ABL stands for automatic brightness limit for automatically adjusting the brightness in the set.

Figure 6:
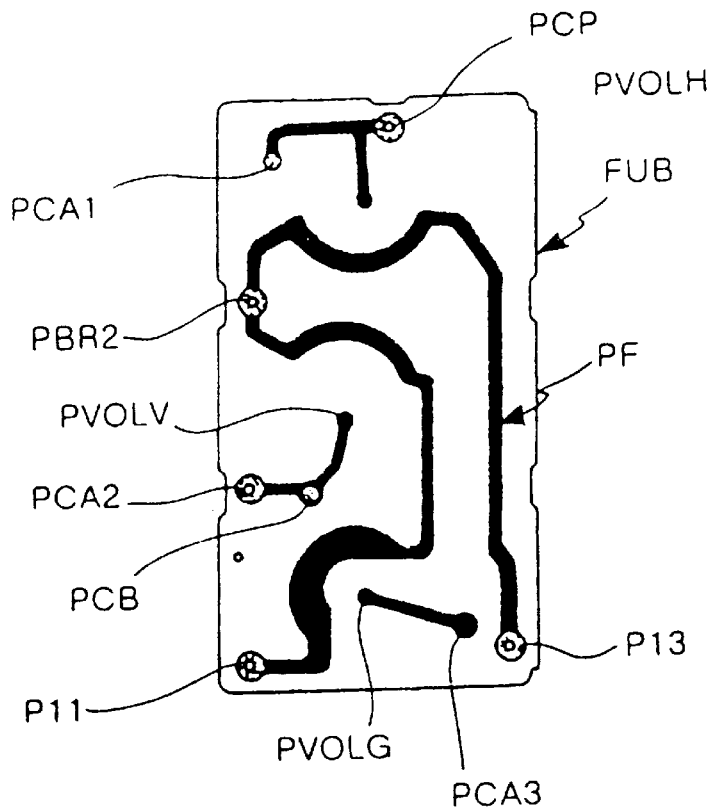
FIG. 6 illustrates the printed patterns formed on the substrate FUB of the focus unit part of the double focusing type fly-back transformer of FIG. 5.

FIG. 6 illustrates the printed patterns formed on the substrate FUB of the focus unit part of the double focusing type fly-back transformer of FIG. 5. Referring to FIG. 6, the substrate FUB of the focus unit part is made of a ceramic, and a resistor is formed on this ceramic board in the form of a printed pattern PF. Here, reference codes PCA1–PCA3 indicate connection points connected to cables CA1–CA3. Reference codes PVOLH, PVOLV and PVOLG indicate volume connection points connected to adjusting volumes VOLH, VOLV and VOLG. Reference codes PCP and PCB indicate capacitor connection points connected to the coupling capacitor CP and the bypass capacitor CB. Reference code PBR2 indicates a bleeder resistor connection point connected to the bleeder resistor BR2. Reference code P11 indicates a connection point connected to the first connection pin #11. Reference code P13 indicates a connection point connected to the third connection pin #13. As shown in FIG. 6, P11 and P13 are separated from each other in the printed pattern PF of the substrate FUB of the focus unit part.

Figure 7:
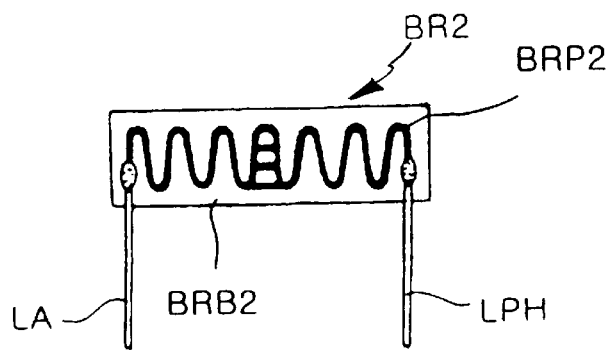
FIG. 7 illustrates the contour of the bleeder resistor BR1 of FIG. 5.

FIG. 7 illustrates the contour of the bleeder resistor BR1 of FIG. 5. Referring to FIG. 7, the bleeder resistor BR2 of the present invention is provided in the form of a printed pattern BRP2 upon a small ceramic substrate BRB2. Reference code LA indicates a lead line connected to a connection point A between the first variable resistor VR21 and the second variable resistor VR22. Reference code LPH indicates a lead line connected to the connection point PH of the anode voltage output line.

Particularly, the bleeder resistor BR2 which is installed within the fly-back transformer 20 has a size of ½ as large as the length of the substrate FUB of the focus unit part, and ¼ as large as the width of the substrate FUB of the focus unit part. That is, the width x length of the substrate of the bleeder resistor BR2 is about 8 mm×30 mm.

Figure 8:
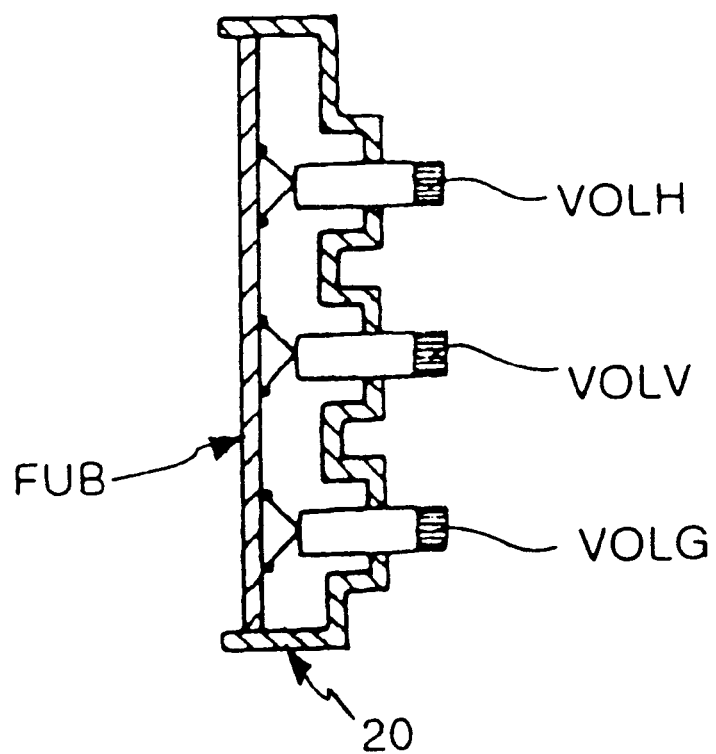
FIG. 8 is a sectional view showing the critical portion of the internal structure of the double focusing type fly-back transformer according to the present invention.

FIG. 8 is a sectional view showing the critical portion of the internal structure of the double focusing type fly-back transformer according to the present invention. In FIG. 8, there is illustrated the relationship of the patterned resistor of the substrate FUB of the focus unit part to the voltage adjusting volumes VOLH, VOLV and VOLG.

The apparatus using the double focusing type fly-back transformer of the present invention constituted as above will now be described as to its operations.

First referring to FIG. 5, the horizontal outputting part 5 operates in accordance with the horizontal synchronizing signals HSS. The horizontal output transistor Q1 is repeatedly turned on and off in accordance with the horizontal synchronizing signals HSS. In accordance with the operations of the horizontal output transistor Q1, a resonance occurs between the tuning capacitor CT and the primary winding L1. The LC resonance causes the generation of the pulse type ac voltages in the primary winding L1. The ac voltages of the primary winding L1 are stepped up by the secondary windings L21–L26 based on the winding ratios of the secondary windings to the primary winding. The stepped-up ac voltages are rectified into dc voltages by the plurality of the rectifying diodes D21–D26.

The rectified high voltages (about 26 KV) are flattened by the high voltage capacitor C21 to be supplied through the anode voltage output terminal HV to the anode terminal of a monitor or the like. Further, the rectified high voltage is divided into a voltage of the focus unit part and a voltage of the bleeder resistor BR2. The divided voltages are supplied as a double focusing voltage and a screen voltage through the horizontal focus voltage output terminal FH, the vertical focus voltage output terminal FV and the screen voltage output terminal G2. Further, the rectified high voltage is divided by the bleeder resistor BR2 and the patterned resistors VR22 and R22 of the substrate FUB of the focus unit part to be supplied through the third connection pin #13 to the initial voltage setting part 12 of the set.

Then the high voltage stabilizing circuit part 11 compares the divided voltage (the detected voltage) with an internal reference voltage (5 V). Then the voltage to be compensated due to the high voltage fluctuations is fed back to the power source B+ of the primary winding L1, thereby stabilizing the high voltage. The operations of the initial voltage setting part 12 and the high voltage stabilizing circuit part 11 will be skipped because they operate in the conventional manner.

Meanwhile, the double focusing unit part which is connected to the bleeder resistor BR2 will be described as its functions. The focus unit part has two basic functions, and the first function is to furnish the double focus voltages (the horizontal focus voltage and the vertical focus voltage) and the screen voltage. The second function is a high voltage dividing function utilizing the feedback line (this voltage dividing was carried out by the bleeder resistor only). That is, the anode voltage output terminal is connected to the initial voltage setting part 12 and the high voltage stabilizing circuit part 11, so that the patterned resistors of the focus unit part together with the bleeder resistor BR2 can perform the function of dividing the anode output voltage. These functions will be described in detail below.

The first function will be described. That is, first the high voltage which is supplied from the anode voltage output terminal HV to the anode terminal is divided by the bleeder resistor BR2, the first variable resistor VR21, the resistor R21 and the third variable resistor VR23. The voltage which has been adjusted to the required level by the first variable resistor VR21 is outputted through the horizontal focus voltage output terminal FH, thereby making it possible to carry out a horizontal focus adjustment. The voltage which has been adjusted to the required level by the third variable resistor VR23 is outputted through the screen voltage output terminal G2, thereby making it possible to adjust the brightness.

Next, the high voltage which is supplied from the anode voltage output terminal HV to the anode terminal is divided by the bleeder resistor BR2, the second variable resistor VR22 and the initial voltage setting part 12. The voltage which has been adjusted to the required level by the second variable resistor VR22 is outputted through the horizontal focus voltage output terminal FH, thereby making it possible to carry out a horizontal focus adjustment.

Figure 1:
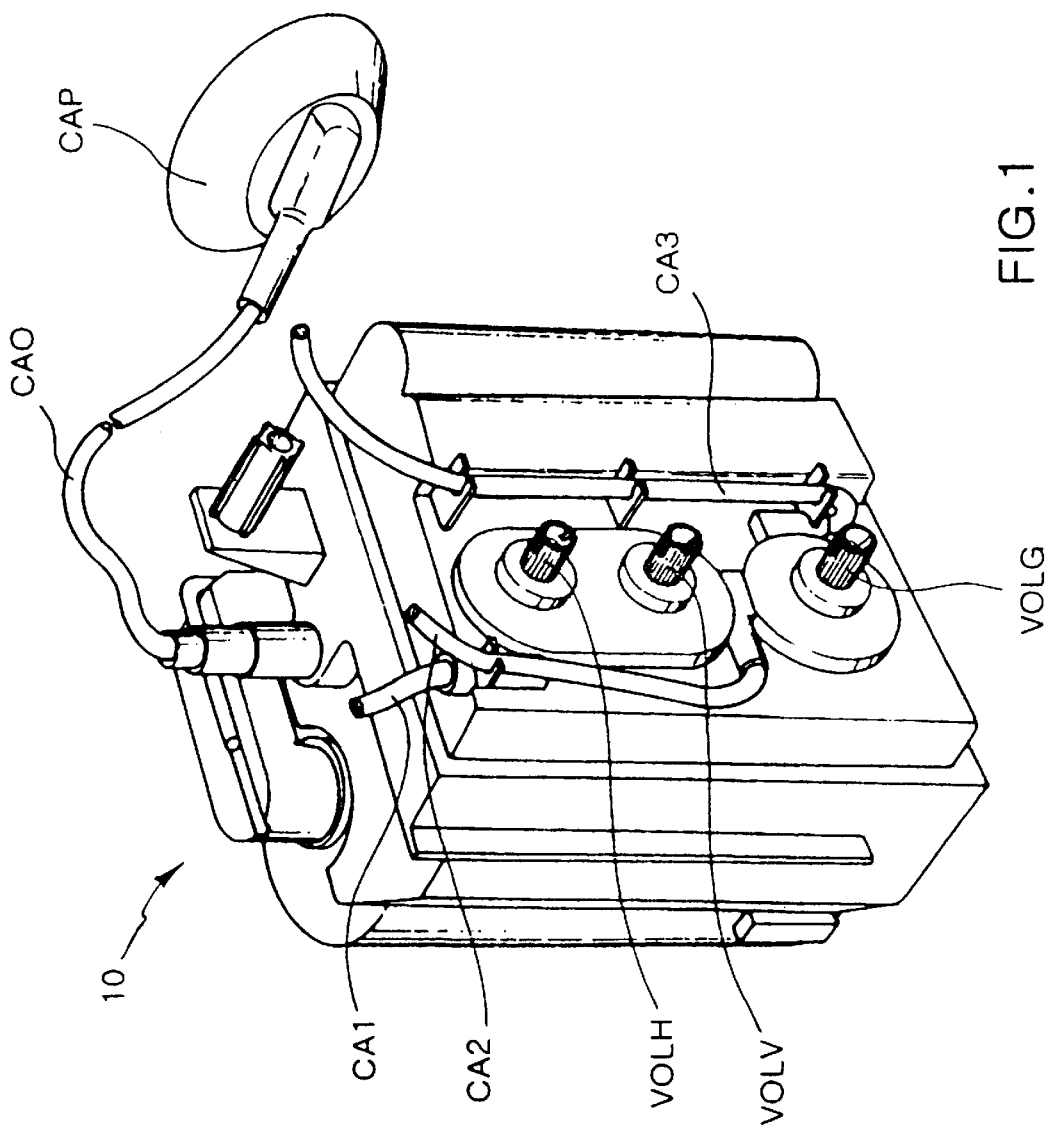
FIG. 1 is a perspective view showing the external shape of the general double focusing type fly-back transformer.
Figure 2:
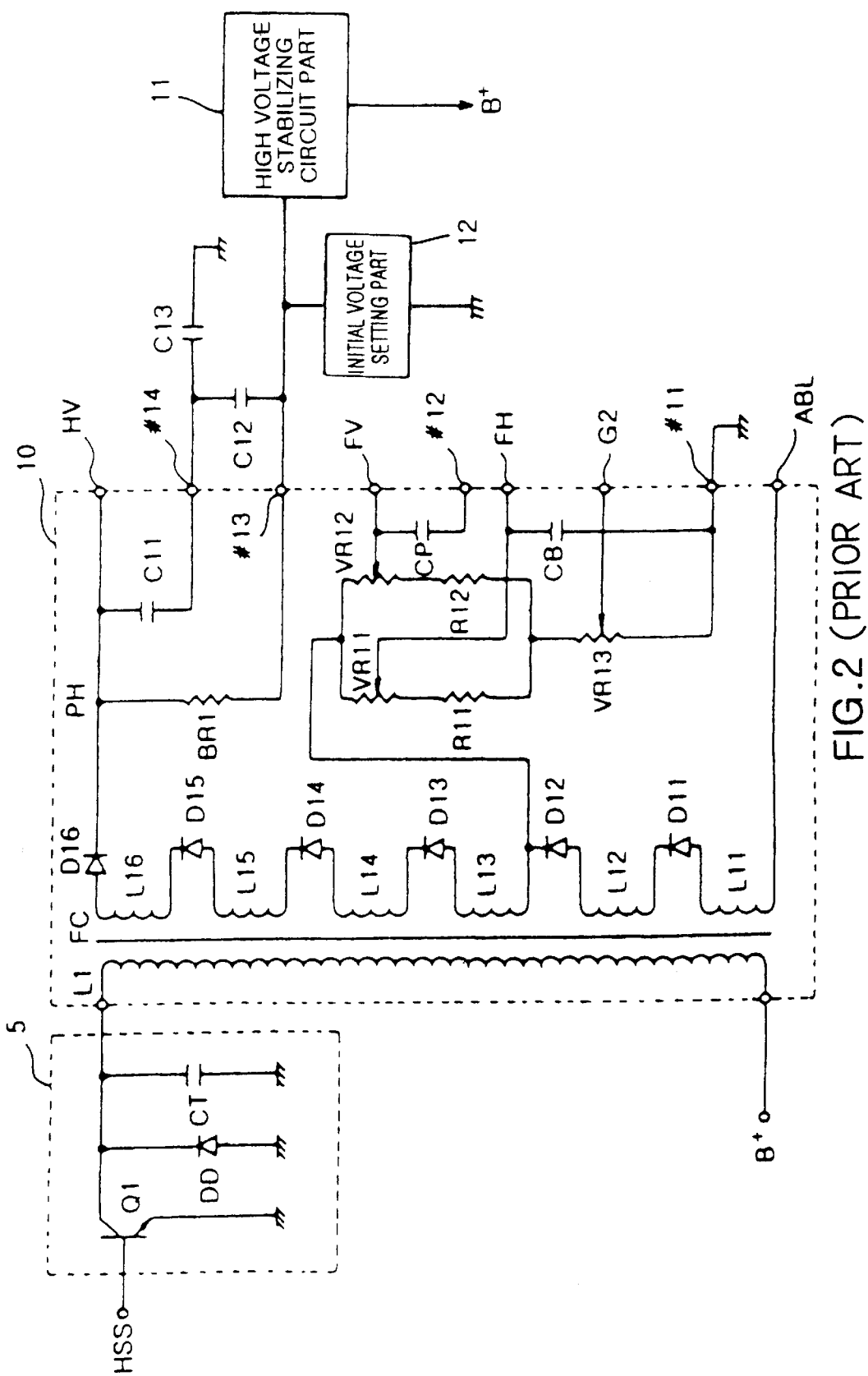
FIG. 2 is a circuit diagram showing the circuital constitution of the conventional apparatus using a double focusing type fly-back transformer.
Figure 3:
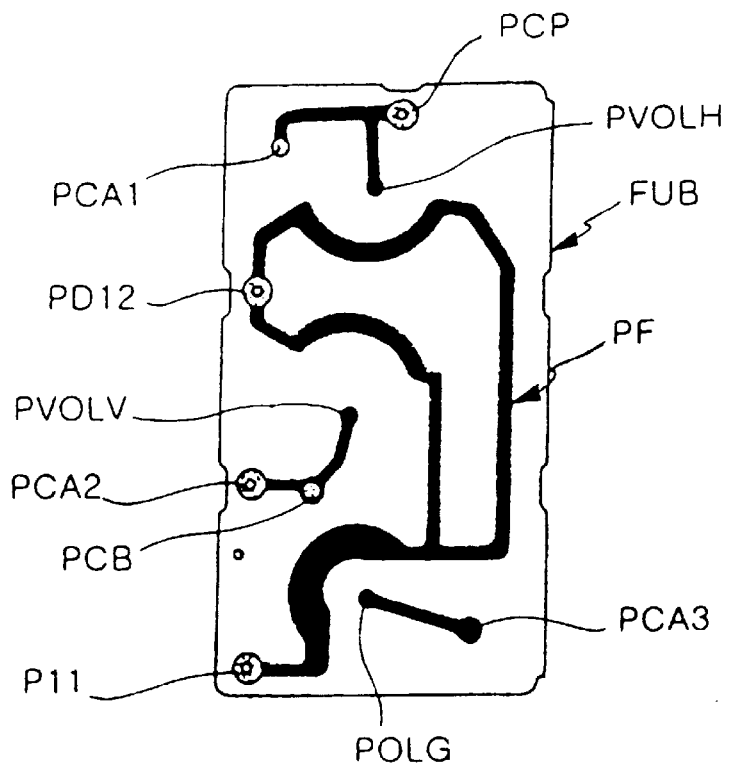
FIG. 3 illustrates the printed patterns formed on the substrate FUB of the focus unit part of the double focusing type fly-back transformer of FIG. 2.
Figure 4:
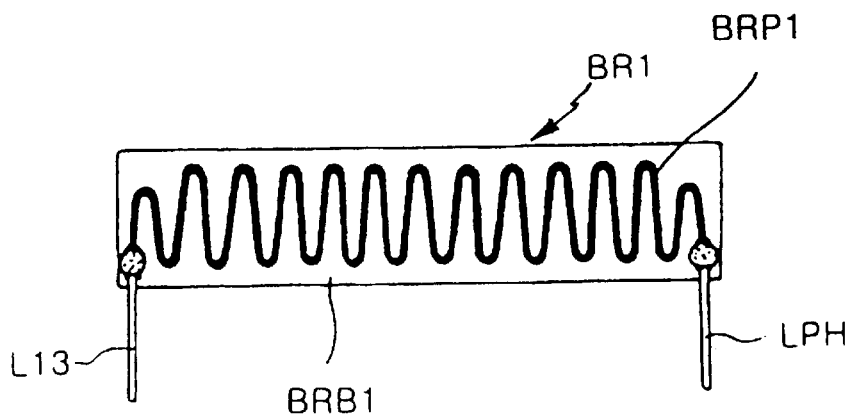
FIG. 4 illustrates the contour of the bleeder resistor BR1 of FIG. 2.

The second function involves a technical concept. The resistors which are provided in the form of printed patterns PF on the substrate FUB of the focus unit part share with the bleeder resistor BR2 the feedback line function (the feedback line function was exclusively performed by the bleeder resistor conventionally). Therefore, the size of the substrate of the bleeder resistor BR2 can be drastically reduced, and this can be confirmed by comparing the conventional bleeder resistor BR1 of FIG. 4 with the inventive bleeder resistor BR2 of FIG. 7. This second function will be described in detail below.

The bleeder resistor BR2, the fixed resistor R22 and the second variable resistor VR22 of the focus unit part are made to form a feedback line toward the initial voltage setting part 12 and the high voltage stabilizing circuit part 11. Thus the high voltage (anode voltage) is divided by the bleeder resistor BR2, the second variable resistor VR22, the fixed resistor R22 and the internal resistors of the initial voltage setting part 12. The high voltage stabilizing circuit part 11 detects the divided voltage from the initial voltage setting part 12, checks the high voltage fluctuations, and supplies the voltage to compensate the power source B+.

Under this condition, if the high voltage stabilizing circuit part 11 is to be able to handle the divided voltage of the initial voltage setting part 12, the high voltage from the anode voltage output terminal has to be divided into a low voltage by the initial voltage setting part 12, so that the high voltage stabilizing circuit part 11 can handle it. Therefore, the high voltage is divided by the bleeder resistor BR2, the second variable resistor VR22 and the fixed resistor R22 by large amounts.

As described above, the high voltage is divided by the bleeder resistor BR2 and the fixed resistor R22 and the second variable resistor VR22 of the focus unit part of FIGS. 5 and 6 by large amounts. The fixed resistor R22 and the second variable resistor VR22 of the focus unit part alleviate the dividing load of the bleeder resistor, and therefore, the size of the substrate of the bleeder resistor BR2 is drastically reduced compared with convectional case in which only the bleeder resistor performs the dividing task.

Referring to FIG. 5, an example will be described in which the rated anode voltage is 26 KV. First, if particular horizontal synchronizing signals HSS of about 15–100 KHz are inputted into the horizontal outputting part 5, then the horizontal output transistor Q1 of the horizontal outputting part 5 are repeatedly turned on and off. Therefore, an LC resonance occurs owing to the primary winding L1 and the tuning capacitor CT of the horizontal outputting part 5. Consequently, ac voltages are generated in the primary winding L1 of the fly-back transformer 20 owing to the LC resonance. The ac voltages are stepped up to above 26 KV by the secondary windings L21–L26 based on the winding ratios of the secondary windings to the primary winding. These stepped-up voltages are rectified into dc voltages of 26 KV by the rectifying diodes D21–D26. Under this condition, the fly-back transformer not only furnishes an anode voltage, horizontal and vertical focus voltages and a screen voltage, but also detects the voltage fluctuations. In accordance with the detected voltage, the power source B+ is compensated. For this purpose, a voltage detecting feedback line is provided to the set, so that the voltages can be supplied in a stable rated level.

First, the anode voltage supply procedure will be described. The dc voltage of 26 KV is flattened into a stable dc voltage by the high voltage capacitor C21, and then, this flattened dc voltage is supplied through the anode voltage output terminal HV to the anode.

Now the supply procedure for the double focus voltage and the screen voltage will be described. The high voltage of 26 KV is divided by the bleeder resistor BR2 of 350 MΩ as much as 16 KV. Further, the resistors VR21, R21 and VR23 of about 480 MΩ and the resistors VR22 and R22 of 480 MΩ form about a resistance of 240 MΩ, and about 10 KV is divided by this resistance. Under this condition, the first variable resistor VR21 of the substrate FUB of the focus unit part is adjusted by means of the adjusting volume VOLH of FIG. 8, so that the horizontal focus voltage outputted to the horizontal focus voltage output terminal FH would become about 4.5–8.5 KV. Further, the second variable resistor VR22 of the substrate FUB of the focus unit part is adjusted by means of the adjusting volume VOLV of FIG. 8, so that the vertical focus voltage outputted to the vertical focus voltage output terminal FV would become about 4.5–8.5 KV. Further, the third variable resistor VR23 of the substrate FUB of the focus unit part is adjusted by means of the adjusting volume VOLG of FIG. 8, so that the screen voltage outputted to the screen voltage output terminal G2 would become about 0.2–1.2 KV.

Now the detection procedure for the high voltage fluctuations by the feedback line will be described. The high voltage of 26 KV is divided by the bleeder resistor BR2 of 350 MΩ by 16 KV. Further, the resistors VR22 and R22 of 480 MΩ divide about 10 KV, and the initial voltage setting part 12 which has internal resistors of about 100–250 MΩ divides the voltage to 5 V. The voltage of 5 V is realized when the high voltage is the accurate rated voltage (e.g., 26 KV). If the high voltage is higher or lower than the rated voltage, that is, if the high voltage shows fluctuations, then the voltage which is detected by the initial voltage setting part 12 will become higher or lower than 5 V. Therefore, the high voltage stabilizing circuit part 11 compares the detected voltage with the internal reference voltage (e.g., 5 V) to know the high voltage fluctuations. Then the feedback control is carried out to compensate the power source B+.

Based on the above described example, the technical concept by which the size of the ceramic substrate of the bleeder resistor BR2 can be drastically reduced will be described below. First, the resistance value of the bleeder resistor BR2 can be reduced from the conventional 600 MΩ to 350 MΩ, with the result that the size of the substrate of the bleeder resistor BR2 is reduced. Second, the voltage level to be divided by the bleeder resistor is lowered from the conventional 26 KV to 16 KV, with the result that the required voltage break-down level is lowered. Therefore, the printed pattern of the bleeder resistor can be made denser, thereby making it possible to reduce the size of the substrate of the bleeder resistor.

The double focusing type fly-back transformer according to the present invention is used in large monitors, and therefore, as shown in FIG. 6, the focus unit circuit has double patterns. That is, the double patterns are required for the horizontal and vertical focuses, and the focus resistors provided in the form of printed patterns serve the role of the bleeder resistor. Therefore, a decrease in the size of the substrate of the bleeder resistor is realized, and consequently, the manufacturing cost of the double focusing fly-back type transformer can be reduced.

According to the present invention as described above, a top bleeder type is adopted in drawing the focus voltage of the fly-back transformer instead of the conventional neutral point type, the double patterns of the focus resistors are separated from each other instead of the conventional common connections to the ground on the substrate FUB of the focus unit part, and one or more of the separately installed focus resistor patterns are used as a feedback line together with the bleeder resistor, thereby drastically reducing the size of the substrate of the printed bleeder resistor.

Therefore, in the present invention, the conventional large size bleeder resistor substrate (about 15 mm×50 mm) is reduced to smaller bleeder resistor substrate (about 8 mm×30 mm). Therefore, the occupation area of the double focusing type fly-back transformer is reduced, and consequently, the manufacturing cost of the double focusing type fly-back transformer can be reduced.

The above descriptions are only one specific example of the present invention, and therefore, various changes and modifications can be added without departing from the technical scope of the present invention.

What is claimed is:

1. An apparatus using a double focusing type fly-back transformer to supply a horizontal focus voltage, a vertical focus voltage and a screen voltage to a CRT of a TV set or a monitor, comprising:

a horizontal outputting part for supplying horizontal synchronizing signals of video signals in a form of pulses to a primary winding;

a plurality of secondary windings for carrying out a voltage step-up in accordance with winding ratios of said secondary windings to said primary winding;

rectifying diodes for rectifying stepped-up output ac voltages of said secondary windings;

a high voltage capacitor for flattening output voltages of said secondary windings;

an anode output terminal for supplying rectified and flattened output voltages to a CRT;

a compensating circuit for sensing dc high voltage fluctuations of said anode output terminal to compensate error values;

a bleeder resistor including a printed pattern formed on a substrate, with one end connected to said anode voltage output terminal; and a focus unit part formed by being printed on said substrate, and connected between another end of said bleeder resistor and said compensating circuit, whereby dc high voltages of said anode output terminal are divided by said bleeder resistor and said focus unit part to reduce a required resistance value and a bleeder resistance value so as to make it possible to reduce a size of a printed substrate of said bleeder resistor.

2. The apparatus as claimed in claim 1, wherein said focus unit part comprises:

a first variable resistor for furnishing horizontal focus voltages;

a second variable resistor for furnishing vertical focus voltages; and a third variable resistor for furnishing screen voltages.

3. The apparatus as claimed in claim 1, wherein one or more of said variable resistors are serially connected between said another end of said bleeder resistor and said compensating circuit.

4. The apparatus as claimed in claim 1, wherein said compensating circuit for compensating error values detects dc high voltage fluctuations, and comprises an initial voltage setting part and a high voltage stabilizing part.

5. The apparatus as claimed in claim 2, wherein one or more of said variable resistors are serially connected between said another end of said bleeder resistor and said compensating circuit.

6. The apparatus as claimed in claim 3, wherein said compensating circuit for compensating error values detects dc high voltage fluctuations, and comprises an initial voltage setting part and a high voltage stabilizing part.

* * * * *